Jan. 16, 1940.  E. D. TILLYER  2,187,105
OPHTHALMIC LENS AND PROCESS OF MAKING THE SAME
Original Filed April 14, 1934
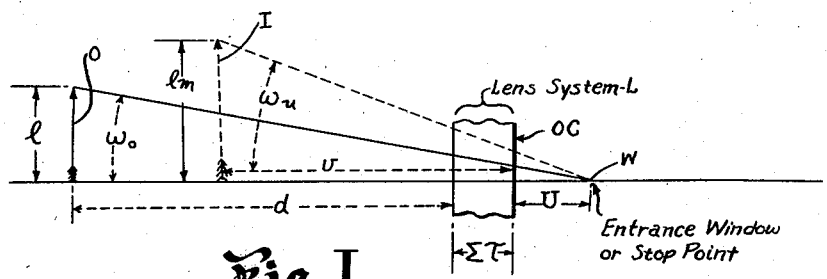
Fig. I
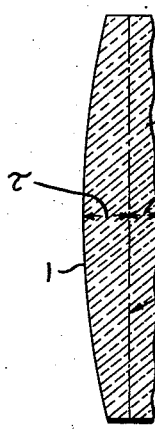
Fig. II
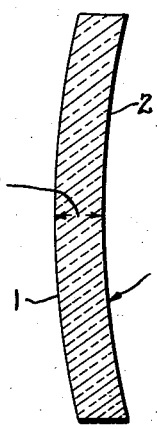
Fig. III
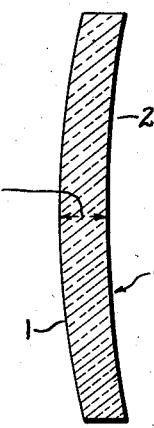
Fig. IV
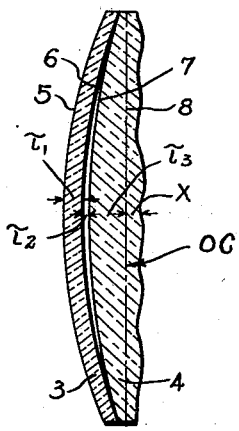
Fig. V
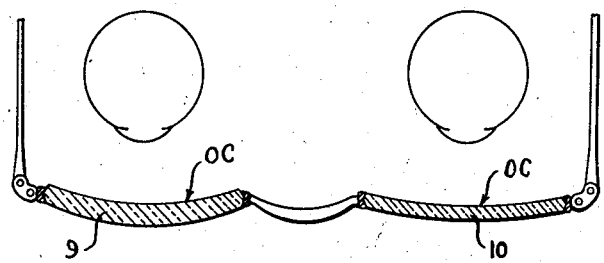
Fig. VI
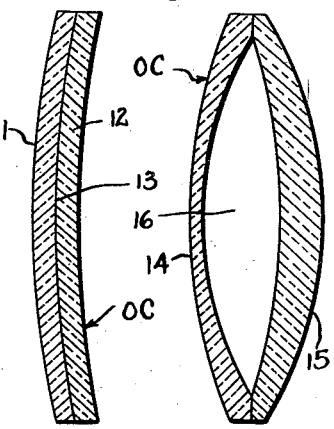
Fig. VII  Fig. VIII
Fig. IX
INVENTOR
*Edgar D. Tillyer.*
BY *Harry H. Styll*
ATTORNEY Patented Jan. 16, 1940

2,187,105

UNITED STATES PATENT OFFICE 2,187,105

OPHTHALMIC LENS AND PROCESS OF MAKING THE SAME

Edgar D. Tillyer, Southbridge, Mass., assignor to American Optical Company, Southbridge, Mass., a voluntary association of Massachusetts Original application April 14, 1934, Serial No. 720,594. Divided and this application March 29, 1937, Serial No. 133,599

4 Claims. (Cl. 88—54)

This invention relates to improvements in ophthalmic lenses and to an improved process for making the same, and relates particularly to ophthalmic lenses used for the equalization of the mental impressions of size in the two eyes said impressions being also referred to in the art as ocular images.

This application is a division of my Tillyer Patent No. 2,077,134, issued April 13, 1937.

One of the principal objects of the invention is to provide means of separating in a lens or lens system the size and the focal power factors, and in a factor form, so one surface is left for the impression of the prescriptive focal power required, and the remaining parts to give the true size effect independently of the said prescriptive surface.

Another object of the invention is to provide means whereby size and power lenses or lens systems may be supplied the dispenser in such form that the lens or lens system may be finished by him to required prescriptive power by simply impressing on one surface the said prescriptive power curve, thereby making it possible to dispense these lenses or systems in the same way ordinary ophthalmic lenses are dispensed in the art, instead of requiring the whole lens or lens system to be made to required prescription by a lens factory which would delay the time in providing the desired lenses to the patient and would materially increase their cost to the patient.

Another object of the invention is to provide a method of computation for lenses and lens systems of this character which takes into account all of the factors involved in lenses or lens systems of this nature and separates out the power effect, the true size effect, and the variations for distance from the eye of the lens or lens system and the distance to the object and eliminating later those of vanishing importance, whereby any prescriptive lens of this nature may be expressed by formula and readily designed therefrom, differentiating from prior methods of computation where individual prescriptions were each figured independently for their individual condition of use, whereby I am able to codify and systematize the entire range required for use for ordinary and usual prescriptions, instead of having to compute laboriously and expensively each individual lens or lens system requiring a laboratory computation and factory production of each required lens or lens system.

Another object of the invention is to provide lens blanks for lenses and lens systems of this character in semi-finished form codified for true magnification or size factor whereby they may be supplied in series of various magnifications which may be completed for required prescriptive power by the dispenser simply by impressing the prescriptive power curve on a surface left therefor.

Other objects and advantage of the invention will become apparent from the following description taken in connection with the accompanying drawing. It is apparent that many changes may be made in the details of construction and arrangement of parts and in the steps of the process without departing from the spirit of the invention as expressed in the accompanying claims, the preferred forms, steps, and arrangements being shown and described by way of illustration only.

Referring to the drawing:

Fig. I is a diagrammatic illustration of a size lens system placed before the eye and viewing an object for the purpose of deriving the generalized formula for lenses and lens systems of the invention;

Fig. II is a cross section of a lens blank of the invention showing a surface left free for impression of the prescriptive power curve;

Fig. III is a view similar to Fig. II of the same lens blank with a definite prescription power curve impressed on the free surface;

Fig. IV is a view similar to Fig. II, with a prescriptive curve on the free surface different from that of Fig. III but having the same value of true magnification $S^1$, but a different effective power $D_e$;

Fig. V is a cross section of a two element lens system showing a free surface for the prescriptive power curve;

Fig. VI is a top diagrammatic sectional view of a pair of spectacles or eyeglasses having lens systems of the invention;

Fig. VII is a cross section of two lenses cemented together for the purpose of aligning the axes on the two outer surfaces;

Fig. VIII is a cross section of two lenses with an air space between; and

Fig. IX is a cross section of a modified form of the invention showing a separator or a filler piece between the lens elements to provide for increasing or decreasing the space between said elements without appreciably increasing the weight of the finished lens.

In the prior art, single vision and multifocal ophthalmic lenses have been dispensed by the factory finishing one side of the lens blank. These blanks were sold to the dispensers who received the patient's prescription and placed on the unfinished side of the blank a surface to complete the lens to prescription requirements. This simplified and cheapened the dispensing of such lenses and saved time for the patient, making one day service to the patient possible. It is clear that it is very impracticable for a factory to have to make individual prescriptions for patients. It would be a lens by lens job, would be very expensive for each case, and would cause almost indefinite delay in delivery. The system described above is the universal system of the art in dispensing such lenses and has through practice been reduced to a very efficient and practical one.

Up to a very short time ago, ophthalmic lenses provided only for focal power, defect in shape of eye, astigmatism and muscular defects, prismatic displacement, utilizing the spherical curve for power, a cylinder or toric curve for astigmatism, and prism for muscular defect. Recently, however, it has been discovered and revealed to the art that there may also be defects in size impressions of the two eyes, one eye may see larger than the other, or a single eye may have a different size impression in different meridians. This defect has been compensated for by adding a magnification factor in the lenses or lens systems, one that will change the size impression or relative size of the ocular images without affecting the focal power of the lens systems. This factor is introduced by means of the property of lenses to change magnification without change of focal power by means of a change of shape, thickness, distance from the eye, and distance of the object from the eye; it is a factor of the shape or form of the lens and not merely its focal power. The prescribing of such lenses is in its infancy. Up to the present time it has been confined to computing the lens in the laboratory and finishing the lens completely at the factory for each individual prescription, a very costly, laborious, and lengthy proceeding, and one impracticable to the organized methods of making and dispensing ophthalmic lenses. It is a principal object of my invention to avoid these expenses, delays, and laborious proceedings involved in making and dispensing lenses of this nature, by providing a simplified and generalized method of computing such lenses by a general formula which I have derived so the same may be codified and systematized to fill the usual and general prescriptions in the usual methods of dispensing now in vogue in the art, simplifying and cheapening the computations as well as the methods of production and dispensing by providing the dispenser with lens blanks as in the present system which may be converted into finished lenses of required magnification and focal power by simply impressing a power surface on one surface of the blank left free for that purpose by the manufacturer, and to provide such blanks in series of varied magnifications which may be utilized by the dispenser to meet the prescriptive requirements of individual prescriptions presented to him embodying the correction of size as well as focal power and astigmatism where the combination of the two is required. My invention embodies both new computations and methods of computation as well as a new method of producing and supplying lenses and blanks of this character.

The majority of size lenses fall within the range from no true magnification to four per cent true magnification.

I assume for the sake of deriving a formula for the image size that the eye is static. At first, I assume an object at any distance and determine rigorous formulae, then assume distant object, then show how distant formulae can be approximately corrected to near object when rigorous near formulae are too complicated for practical use.

If the eye, in looking at a distant object, has any kind of a lens system in front of it, then the bundle of light rays, forming either images or blurred images (if the focus is not sharp), passes through a fixed opening which is the image of the pupil of the eye as formed by the cornea; in other words, assume that there is a fixed opening properly placed like a stop. We can then derive the following expression for the magnification of this lens system:

$$M^1 = \frac{1}{1-UD_e} \times \frac{1}{C}$$

Where
$M^1$ = the complete magnification for a distant object.
$U$ = the distance from fixed opening (entrance window) to ocular surface of the lens system.
$D_e$ = the effective power of the lens system.
$C$ = A function of all the surfaces, refractive indices of the glass, thicknesses, and separations, except the power of the ocular surface.

An analysis of this formula shows that the complete magnification for a static eye and distant object is the product of two independent terms, namely, the first term gives the magnification effect produced by the focal power, and the second gives the magnification effect of the shapes, separations, thicknesses, etc., i. e., the magnification, except that the last ocular surface is left free so a surface may be placed on it to give the desired prescriptive power.

I indicate the distant magnification due to power $P^1$, and the magnification due to shape or form $S^1$, then:

$$P^1 = \frac{1}{1-UD_e} \text{ and } S^1 = \frac{1}{C}$$

and $$M^1 = P^1 \times S^1 = \frac{1}{1-UD_e} \times \frac{1}{C}$$

The examination of the eyes for their errors, obviously, must determine their refractive correction which is $D_e$ and which, because of unavoidable thickness of the test lenses does contain some $C$ or $S^1$ but which can be allowed for, and likewise must contain the complete power magnification $P^1$.

Next let us consider U so we can determine $P^1$. It is measured from a point roughly four millimeters on the retinal side of the cornea to the ocular surface of the test lens, or from the center of rotation of the eye, if the eye rotates but we need not know its accurate value, in fact, if we put the ocular surface of the prescription lens at the same place as the ocular surface of the test lens we do not need its value at all, since $P^1$ for the prescriptive lens will be the same as $P^1$ for the test lens system. Roughly, U is twenty millimeters, since everything in lens theory is expressed in meters, U=0.020 meter.

If the test lens is placed at a different position than the prescription lens there is a change in $P^1$ due to change in U, this change in U must be known accurately but not the actual value of U, likewise $D_e$ must be changed or corrected, as is well known, to compensate this change because the effectivity of focal power of the lens changes as its distance from the eye is changed.

This leaves $S^1$ or the true magnification uncontaminated with varying degrees of corrected eye focus. The commercial importance of $$S^1 = \frac{1}{C}$$

is that C does not contain the ocular surface, and in consequence any necessary ocular surface can be ground into the system to give the required value of $D_e$ or the focal power correction. In other words, semi-finished blanks can be tabulated and stocked giving magnification $S^1$ and a curve placed on the ocular side to give the prescription desired. This eliminates a great deal of difficulty in transcription and stocking of lenses of this nature.

We next consider the effect of position of the prescription in front of the eye, assuming the eye fixed; a change in the position of the prescription in front of the eye is a change in U. For the effect of a change in U, we can make an approximation to our exact equation:

$P^1 = 1 + UD_e$ approximately, or in percentage and millimeters:

$(P^1-1)$ in percentage $= \frac{1}{4}\%$, times the change in U in millimeters for a value of $D_e$ of 2.50 diopters (an average prescription).

Since we must keep the product $P \times S$ constant, we must change S if we change P. If $D_e$ is more, the change is more and vice versa.

The determination of the position of the test lens and the prescription lens must be accurate. The most accurate measurement that can be physically made is from the front surface of the prescription lens to the front surface of the cornea, but U should be measured from the ocular surface, i. e., the ocular surface of the test lens should be positioned the same with respect to the cornea or the ocular surface of the prescription lens as is common ophthalmic practice.

It will be seen from the formula $$M^1 = \frac{1}{1-UD_e} \times \frac{1}{C}$$

that in the part of the expression $$\frac{1}{1-UD_e}$$

I have collected all of the elements involving the focal power of the lens system, expressed as $D_e$ the effective power of the lens as it is ordinarily measured combined with a distance U which indicates the position the lens is placed before the eye, while in the portion $$\frac{1}{C}$$

I have collected all the elements which are independent of the position of the lens and out of which I have kept or excluded one surface, i. e., the ocular surface, which makes it possible for me to change the said ocular surface at will to get a desired value of the power $D_e$ without changing the true size magnification represented by $$\frac{1}{C}$$

and which is called herein $S^1$.

It is because of this separation of the equation into the two groups that I am able to provide lenses on which different powers of ocular surfaces may be imposed without affecting the true magnification of the lens, thereby making it possible to dispense the lenses in the usual way that ophthalmic lenses are dispensed by the dispensers in that art, which has hitherto been considered impossible.

The free or excluded surface which I have is ordinarily the ocular surface of the lens system, i. e., the surface nearest the eye.

My method of analysis is based on the principles of Gauss as laid down by Pendlebury in 1884 with my necessary extensions to that theory.

The following considerations and symbols are used in this analysis:

The direction of incident light, left to right is positive. All rays measured in this direction are positive.

A radius of curvature, convex to the incident light is positive.

The order of indices of the refractive medium are indicated. $\mu_0$, $\mu_1$, $\mu_2$ etc. ($\mu$ being the Greek letter mu).

Surface powers, $$\rho_1 = \frac{\mu_1 - \mu_0}{r_1}, \rho_2 = \frac{\mu_2 - \mu_1}{r_2} \text{ etc.}$$

($\rho$ being the Greek letter rho).

Thickness $\tau$ (the Greek letter tau) positive; reduced thickness $$\frac{\tau_1}{\mu_1} = -t_1 \text{ etc.}$$

are negative, but when $s$ is used for a reduced thickness it is positive; likewise, when D (diopter) is used in place of $\rho$ (rho) it has the conventional value as ordinarily used in ophthalmic practice. The reason for the adoption of the above arbitrary negative values of the reduced thickness "$t$" is to keep all the signs in a convenient form.

$$\frac{1}{M^1} = -U C. D_e + C = C(1 - U D_e)$$

Note that $D_e$ also the D which refers to surface powers is not the $$D = \frac{\partial^2 A}{\partial \rho_1 \partial \rho_n}$$

Then if we call the part of the magnification for a distant object due to the power D and that due to shape $S^1$ then $$P^1 = \frac{1}{1-UD_e}; \quad S^1 = \frac{1}{C}; \quad P^1 \times S' = M^1$$

$D_e$ is what is commonly called the effective power or vertex refraction of the lens and is actually the reciprocal of the back focal length of the lens expressed in meters.

The form of A, B, C, D is obtained as follows $$A; \quad B = \frac{\partial A}{\partial \rho^1}; \quad C = \frac{\partial A}{\partial \rho_n}; \quad D = \frac{\partial^2 A}{\partial \rho^1 \partial \rho_n}$$

also $$\frac{\partial C}{\partial \rho_n} = 0; \quad \frac{\partial B}{\partial \rho^1} = 0$$

$$\frac{\partial A}{\partial \rho^1}$$

is an expression indicating the partial derivative of A with respect to $\rho_1$; etc.

$$A_1 = \rho_1$$

$$A_{2n-1} = A_{2n-3}(\rho_n t_{n-1} + 1) + \rho_n \frac{\partial A_{2n-3}}{\partial \rho_{n-1}}$$

by means of which the equation for $n$ surfaces can be obtained.

*For two surfaces*

$$A_3 = \rho_1 + \rho_2 + \rho_1\rho_2 t \quad C = 1 + \rho_1 t$$

or in terms of D and $s$ ophthalmic notation $$A_3 = D_1 + D_2 - s_1 D_1 D_2; \quad C = 1 - sD_1; \quad \therefore S = \frac{1}{1 - sD_1}$$

For four surfaces—two separated lenses $n=4$ $$A_7 = \rho_1 + \rho_2 + \rho_3 + \rho_4 + \rho_1\rho_2 t_1 + \rho_1\rho_3 t_2 + \rho_2\rho_3 t_2 +$$
$$\rho_1\rho_2\rho_3 t_1 t_2 + \rho_1\rho_3 t_1 + \rho_1\rho_4 t_3 + \rho_2\rho_4 t_3 + \rho_3\rho_4 t_3 +$$
$$\rho_1\rho_2\rho_4 t_1 t_3 + \rho_1\rho_3\rho_4 t_2 t_3 + \rho_2\rho_3\rho_4 t_2 t_3 + \rho_1\rho_2\rho_3\rho_4 t_1 t_2 t_3 +$$
$$\rho_1\rho_3\rho_4 t_1 t_3 + \rho_1\rho_4 t_2 + \rho_2\rho_4 t_2 + \rho_1\rho_2\rho_4 t_1 t_2 + \rho_1\rho_4 t_1$$
$$C_7 = 1 + \rho_1 t_3 + \rho_2 t_3 + \rho_3 t_3 + \rho_1 t_2 + \rho_2 t_2 + \rho_1 t_1 + \rho_1\rho_2 t_1 t_3 +$$
$$\rho_1\rho_3 t_2 t_3 + \rho_2\rho_3 t_2 t_3 + \rho_1\rho_3 t_1 t_3 + \rho_1\rho_2 t_1 t_2 + \rho_1\rho_2\rho_3 t_1 t_2 t_3$$
$$B_7 = 1 + \rho_2 t_1 + \rho_3 t_2 + \rho_2\rho_3 t_1 t_2 + \rho_3 t_1 + \rho_4 t_3 + \rho_2\rho_4 t_1 t_3 +$$
$$\rho_3\rho_4 t_2 t_3 + \rho_2\rho_3\rho_4 t_1 t_2 t_3 + \rho_3\rho_4 t_1 t_3 + \rho_4 t_2 + \rho_2\rho_4 t_1 t_2 + \rho_4 t_1$$
$$D_7 = t_1 + t_2 + t_3 + \rho_2 t_1 t_3 + \rho_3 t_2 t_3 + \rho_3 t_1 t_3 + \rho_2 t_1 t_2 + \rho_2\rho_3 t_1 t_2 t_3$$

By means of preceding formulae any number of surfaces may be obtained.

*Four surfaces—Important terms*

The important terms for a distant object are collected below ($\tau_2$ is an air space between lenses)

$$\frac{1}{S^1} = \{1 - S_3(D_1 + D_2 + D_3) - \tau_2(D_1 + D_2) - D_1 S_1\}$$

$$\frac{1}{P^1} = 1 - UDe \quad M^1 = P^1 \times S^1$$

The neglected terms are of the order of magnitude of 2 thicknesses and 2 powers multiplied together and 5 in number, generally two of one sign three opposite.

*Two surfaces*

$$S^1 = \frac{1}{1 - S_1 D_1}$$

no terms dropped

*General magnification near object*

$$\frac{1}{M} = \frac{UB - AUd + Cd - D}{d\left(1 + \frac{\Sigma\tau + U}{d}\right)}$$

but $A = CDe$ and $\frac{1}{M^1} = C(1 - UD_e)$

Therefore $$\Delta\frac{1}{M} = \frac{1}{M} - \frac{1}{M^1} = \frac{UB - D}{d + \Sigma\tau + U} +$$
$$\frac{C(1 - UD_e)}{1 + \frac{\Sigma\tau + U}{d}} - \frac{C(1 - UD_e)}{1}$$

$$(d + \Sigma\tau + U)\Delta\frac{1}{M} = UB - D - \frac{1}{M^1}(\Sigma\tau + U)$$

$$= UB - D - \Sigma\tau - U + \left(1 - \frac{1}{M^1}\right)(\Sigma\tau + U)$$

$$= U(B-1) - (D + \Sigma\tau) + \left(1 - \frac{1}{M^1}\right)(\Sigma\tau + U)$$

$$D + \Sigma\tau = \tau_1\left(\frac{\mu_1 - 1}{\mu_1}\right) + \tau_2\left(\frac{\mu_2 + 1}{\mu_2}\right) + \tau_3\left(\frac{\mu_3 - 1}{\mu_3}\right),$$

approximately for four surfaces; since $$\tau_1 = -\mu_1 t_1 \text{ etc.}$$

$$U(B-1) = U\{t_1(\rho_2 + \rho_3 + \rho_4) + t_2(\rho_3 + \rho_4) + t_3\rho_4\}$$
approximately $$1 - \frac{1}{M_1} = 1 - C + CUD_e = 1 - C + UA =$$
$$- t_1\rho_1 - t_2(\rho_1 + \rho_2) - t_3(\rho_1 + \rho_2 + \rho_3) +$$
$$U(\rho_1 + \rho_2 + \rho_3 + \rho_4) \text{ approximately}$$

Therefore $$(d + \Sigma\tau + U)\Delta\frac{1}{M} = U\{t_1(-\rho_1 + \rho_2 + \rho_3 + \rho_4) +$$
$$t_2(-\rho_1 - \rho_2 + \rho_3 + \rho_4) + t_3(-\rho_1 - \rho_2 - \rho_3 + \rho_4) +$$
$$U(\rho_1 + \rho_2 + \rho_3 + \rho_4)\}$$

$$-\tau_1\left(\frac{\mu_1 - 1}{\mu_1}\right) - \tau_2\left(\frac{\mu_2 - 1}{\mu_2}\right) - \tau_3\left(\frac{\mu_3 - 1}{\mu_3}\right) -$$

$$\Sigma\tau\{t_1\rho_1 + t_2(\rho_1 + \rho_2) + t_3(\rho_1 + \rho_2 + \rho_3) -$$
$$U(\rho_1 + \rho_2 + \rho_3 + \rho_4)\}$$

This formulae includes second order terms but not third order, and gives the differences between the reciprocals of the magnification of a near and a distant object.

A semifinished lens with all surfaces finished except the prescription surface $\rho_4$ will have all the quantities except the $\rho_4$ already compensated for in the design. This leaves only $$UxUx(\rho_1 + \rho_2 + \rho_3 + \rho_4)$$

which is already eliminated when U is the same with the test lenses as with the prescription lenses and $(\rho_1 + \rho_2 + \rho_3 + \rho_4)$ is the approximate value of the actual power prescription, and the terms $$U\rho_4(t_1 + t_2 + t_3) + U\rho_4\Sigma\tau$$

which is equal to $$U\rho_4\left\{\tau_1\left(1 - \frac{1}{\mu_1}\right) + \tau_2\left(1 - \frac{1}{\mu_2}\right) + \tau_3\left(1 - \frac{1}{\mu_3}\right)\right\}$$

which cannot be completely compensated for in the semifinished blanks since $\rho_4$ will vary with the power of its prescription. However let us limit the range of powers over which a given semifinished series of blanks is to be used, then we will know the approximate value of this term. For an extreme range we can take $\rho_4$ to vary from $-5D$ to $-15D$ which is $5D$ each side of the mean, then we can take $\mu = 1.5$, the total thickness $\Sigma\tau$ as 0.010m and $U = 0.02$m then the error in $\Delta$—is $$\frac{0.02 \times 5 \times 0.010 \times 0.3}{0.4} = 0.0008$$

or if this is reduced to per cent in magnification we have 0.08% which is closer than required and can be further reduced if desired.

It is thus seen that semifinished blanks can be made practically so that the prescription curve can be placed on one surface for near as well as for distance.

For the discussion of Pendlebury referred to above see "Lenses and Systems of Lenses treated after the manner of Gauss, by Charles Pendlebury, M.A., F.R.A.S., Published, Cambridge, England, 1884."

Referring to Fig. I the following is an explanation of the symbols used:

Object $l$ is imaged into $lm$.
Distance object to lens system $= d = -u$.
Distance image to last surface of lens $= -v$.
Angular size of object from stop point $\omega_0$.
Angular size of image from stop point $\omega_n$.

$$\text{Magnification (angular)} = \frac{\tan \omega_n}{\tan \omega_0} = M$$

Distance stop from lens system U.
Total thickness of lens system $\Sigma\tau$.
Linear magnification $= m$.

$$\tan \omega_0 = \frac{l}{d + \Sigma\tau + U} \quad \tan \omega_n = \frac{ml}{U - V}$$

$$M = \frac{d + \Sigma\tau + U}{\frac{1}{m}(U - V)}$$

but from Pendlebury $$\frac{1}{m} = Au + B = B - Ad$$

$$v = \frac{Cu + D}{Au + B} = \frac{D - Cd}{B - Ad}$$

$$M = \frac{d + \Sigma\tau + U}{(B - Ad)\left(U - \frac{D - Cd}{B - Ad}\right)} = \frac{d + \Sigma\tau + U}{BU - AUd - D + Cd}$$

or $$\frac{1}{M} = \frac{U(B - Ad) + (Cd - D)}{d + \Sigma\tau + U}$$

A, B, C and D are expressions from Pendlebury and are given later.

But if the object is at a distance, $d$ is large in comparison with everything else. Call the magnification for a distant object $M'$ instead of $M$, we have $$\frac{1}{M^1} = -AU + C$$

from Pendlebury $$\frac{1}{v} = \frac{A}{C} = De$$

and C does not contain the last surface.

The lens shown in Fig. II comprises a lens element having the surface 1 and a thickness greater than $\tau$, say $\tau + x$, where $x$ is sufficient extra glass so that the lens may be finished to the thickness $\tau$. The surface 1 is finished optical surface. The surface 2 may be left unfinished for a purpose to be described later.

To start with, say we desire a lens having a certain $S^1$, or true size magnification. Then we have $$S^1 = \frac{1}{1 - sD_1}$$

where $D_1$ is the surface power of 1 and $s$ is the thickness $\tau$ divided by the refractive index of the glass. It will be seen from this formula that either small or large values of s can be used provided we use with the small values, large values of $D_1$ and vice versa, so we choose a good average value of both s and $D_1$ for a commercial lens, which values are so chosen as to satisfy the above equation.

Then we compute the effective power or vertex refraction of the lens, assuming the surface 2 to be flat or plano.

Then if we wish a lens with no focal power, we put on surface 2 the focal power computed with opposite sign, as for example, if say, a flat surface 2 gives an effective power of plus 6 diopters, we would for a zero power lens grind a minus 6 diopter surface curve on the face 2. If we wished a power of plus 1 diopter, we would grind on the face 2 a minus 5 diopter curve and so on. Whatever the surface ground on the face 2, the thickness $\tau$ must be preserved for the finished lens in order to maintain the $S^1$ value of the lens.

When the eye has been tested, the magnification due to the power of the lens has been placed in front of the eye in the test lenses, so we do not need to include $P^1$ of the formula, unless we wish to change the distance the prescription lens is to be placed before the eye when it is to be other than that of the trial lens. When we do make this change of distance this obviously changes U in the formula for $P^1$ and must be allowed for.

In the test lenses, if they were very thin, they would involve no shape magnification, but actually they are not very thin, so there is some $S^1$ for the test lens. This must be added on to the pure size measurements which have been made in order to get the complete size difference $S^1$. If there are power test lenses in front of each eye, then there is only the ratio of the $S^1$ of one test lens to the $S^1$ of the other to be allowed for.

In Fig. III there is shown the same lens as Fig. I, except that a power curve has been placed on the face 2 to show a lens of zero power.

In Fig. IV there is shown a lens the same as Fig. I, but a different curve has been placed on the face 2 to give a different focal power to the lens, but all the lenses of Figs. III and IV have the same true size magnification $S^1$.

In Fig. V there is shown a lens system of two separate lens elements 3 and 4, having surfaces 5, 6, 7, and 8, and thicknesses $\tau_1$, $\tau_2$, and $\tau_3$, where $\tau_2$ is an air space. The surface 8 has been left unfinished, and the actual value of $\tau_3$ is $\tau_3 + x$, as explained before, the $x$ to be ground away when surface 8 is finished to required prescription curve.

In computing this lens we use the extended formula for a sequence of four lens surfaces instead of the two of the lens of Fig. I. This formula for $S^1$ for the four surfaces does not contain the fourth surface but only its position. This lens system, as for the lens system of Fig. I, gives a lens system of required true size magnification $S^1$ and a free surface 8 to be varied as required to give required focal prescription power of the lens system.

Applying the formula $$M^1 = \frac{1}{1 - UD_e} \times \frac{1}{C} = P^1 \times S^1$$

to the lenses in Fig. II;

We have no $D_e$ in this lens because it is a blank with surface 1 finished according to the $$\frac{1}{C}$$

formula and the thickness of the ultimate lens determined by the same formula.

In Fig. III we have a lens with $D_e$ equal to zero and the lens is finished to the thickness $\tau$ as described for Fig. II with a curve on the ocular side 2 such that there is zero $D_e$ power.

In Fig. IV we have the same lens finished to give a $D_e$ of plus one diopter focal power.

To determine the curve 1 and the thickness $\tau$ of all these lenses, i. e., Figs. II, III, and IV, we assumed that we required a magnification 1.8 per cent, which makes $S^1 = 1.018$—which is 1.8 per cent greater than unity. Then we have for the true size magnification ($S^1$) equals one divided by $1 - s_1 D_1$ of the formula. Thus, if we take $D_1$, the power of surface 1 equal to plus six diopters $s$ is 0.003, but $s$ is the so called reduced thickness, therefore, it must be multiplied by the index of refraction of the glass to get the actual glass thickness $\tau$ of the finished lens, which is 0.003 times 1.52 equal to 0.0046 meters or as is commonly expressed 4.6 millimeters. Thus we have a front surface 1 of 6 diopters and a thickness $\tau$ of 4.6 millimeters. We have not carried out this example to the number of decimal places that we would in actual lens design.

If for other reasons we wish to make the surface 1 steeper or less steep, we can change $r$ to correspond and get the same magnification, so long as we use the formula $$S^1 = \frac{1}{1 - sD_1}$$

In Fig. III we have $D_e$=zero, so that we make surface 2 slightly stronger than surface 1 to make the effective power $D_e$=zero by the regular formula. This means that this surface has a power of −6.12 diopters to the nearest 1/8 diopter tool available. This lens has a true size magnification 1.8 per cent with no power and no power magnification.

In Fig. IV we have put on the ocular surface of this lens a surface power of −5.12 diopters and the thickness as previously determined of 4.6 millimeters. This lens has a true size magnification of 1.8 per cent and also a power magnification $P^1$ equal to $$\frac{1}{1 - UD_e}$$

However, it is not necessary to compute $P^1$ since this part of the magnification due to $D_e$ is already in the test lenses. Also, because of the finite dimensions of the test lenses there is a small shape magnification due to their thickness and shape in addition to the size correction from the size lenses, but in uniting the prescription the small shape correction of the test lenses is combined with the size correction found from the size lenses.

In the lens system of Fig. V we use the formula $M^1 = P^1 \times S^1$ where $S^1$ is $$\frac{1}{C_7}$$

which has previously been given.

The prescription gives $S^1$ and the power $D_e$. In this case we have a number of surfaces $D^1$, $D_2$, $D_3$, or as we have written them $\rho_1$, $\rho_2$, $\rho_3$, also the reduced thickness is for the first lens, the air space which is the second separation in the formula $C_7$, and finally the third reduced thickness. These are many more quantities than are necessary for simply the determination of the magnification, so we can impose other conditions as required, and get the same true magnification, $S^1$, from the formula of $C_7$. After the surfaces and thickness have been determined to give the magnification $S^1$, we can put the ocular surface on this lens to give the required value of $D_e$ by the usual formula for effective power.

The lens system of Fig. V has the following characteristics.

Index of glass 1.5.

Radius of surface 5=50 millimeters, giving a surface power of plus 10 diopters.

Radius of surface 6=60 millimeters, or surface power of minus 8.33 diopters.

Radius of surface 7=70 millimeters, or surface power of plus 7.14 diopters.

Thickness $\tau_1 = 2$ millimeters, giving the reduced $t_1$ of minus 0.0013 meter.

Thickness $\tau_2 = 0.6$ millimeter, giving reduced $t_2$ since this is an air space=minus 0.0006 meter.

Thickness $\tau_3 = 3.5$ millimeters, or a reduced thickness $t_3$ minus 0.0023 meter.

This surface 8 is to be determined by the power $D_e$ desired in the prescription.

The lens was figured as follows from formula $C_7$:

5 50 mm. radius $\rho_1 = \frac{1.5 - 1}{.050} = +10D$

6 60 mm. radius $\rho_2 = \frac{1 - 1.5}{0.060} = -8.33$

7 70 mm. radius $\rho_3 = \frac{1.5 - 1}{0.07} = +7.14$ $\tau_1 = 0.002$ m.    $t_1 = -0.0013$
$\tau_2 = 0.0006$      $t_2 = -0.0006$
$\tau_3 = 0.0035$      $t_3 = -0.0023$ $\rho_1 t_1 = -0.0130$    $\rho_2 t_2 = +0.0050$    $\rho_3 t_3 = -0.0164$
$\rho_1 t_2 = -0.0060$    $\rho_2 t_3 = +0.0192$
$\rho_1 t_3 = -0.0230$    $\phantom{\rho_2 t_3 =} +0.0242$    $\phantom{\rho_3 t_3 =} -0.0164$
$\phantom{\rho_1 t_3 =} -0.0420$ $\rho_1\rho_2 t_1 t_3 = -0.0002$    $\rho_1\rho_3 t_2 t_3 = +0.0001$    $\rho_1\rho_2\rho_3 t_1 t_2 t_3 =$
$\rho_1\rho_3 t_1 t_3 = +0.0002$    $\rho_2\rho_3 t_2 t_3 = -0.0001$    $0.0000$
$\phantom{\rho_1\rho_3 t_1 t_3 =} +0.0000$    $\phantom{\rho_2\rho_3 t_2 t_3 =} 0.0000$
$\rho_1\rho_2 t_1 t_2 = -0.0001$ Therefore $C_7 = 1 - 0.0343 = 0.9657$ and $S^1 = 1.0355$ or the value of the true size magnification for this lens is 3.5%. The required power $D_e$, can be computed for any value of $\rho_4$ or the value of $\rho_4$ can be determined for any value of $D_e$ required by well known computations.

In Fig. VI there is shown a pair of lenses 9 and 10 mounted in a frame before the eyes. Let us assume that the eye in front of which is mounted the lens 9 requires a given amount of true magnification $S^1$ over that of the other eye. There will be some unavoidable magnification in the lens 10, so we must make $S^1$ of the lens 9 larger than $S^{11}$ by this amount, as for example, suppose the eye which the lens 9 is in front of requires a true magnification of 1.02 and the lens 10 has a true shape magnification of 1.01, then we must make the lens 9 to have a size magnification $S^1$ equal to the product of 1.01 multiplied by 1.02, which gives about 1.03 for the shape magnification required; in other words, the ratios of the magnifications of the two lenses must be the required amount to give the right size correction to the eyes.

In Fig. VII there is shown a two element lens system composing the elements 11 and 12 fitted together on their contacting faces 13 and secured together by cement or otherwise to make a unitary lens structure.

In Fig. VIII there is shown a two element lens system, comprising the elements 14 and 15 with an air space 16 between them. The two elements are fitted and secured together adjacent their marginal edges to form a unitary lens structure.

The structures of Figs. VII and VIII are particularly important where the true size magnification is different in one meridian than in the other, and in consequence requires a toric surface on a face of each part because the toric axes may be easily aligned after they are finished by rotating one element on the other, it being a very difficult and expensive operation to align toric axes in one piece structures with sufficient accuracy.

In Fig. IX there is shown a modified form of the invention wherein the lens elements 17 and 18 are held in spaced relation by a spacer member or filler piece 19 of glass or other suitable means which is varied in thickness to increase or decrease the space between the lens elements and thereby increase or decrease the magnification without appreciably increasing the weight of the finished lens. The edges of the lens elements 17 and 18 may be faced as shown at 20 to receive the filler piece or the said filler piece may be shaped as shown at 21 to receive the lens elements.

In all of the above figures, the letters OC indicate the surface on the eye side of the lens on which the final prescriptive curve is to be formed to finish the lens.

The lens blanks of this invention may be supplied as single units for various values of $S^1$ either spherical or toric, in the latter case there are two values of $S^1$ for each blank. A desired prescription may be filled by the dispenser by picking out a blank with the desired $S^1$ value and placing on the free face the required prescription curve to give the desired focal power.

The blanks may be also supplied in series of different magnifications graded to meet usual practical requirements.

The surfaces may be spherical, cylindrical, toric prismatic, aspheric or any of the surfaces of prior art lenses and ground and finished in the usual prior art way by prior art methods and for the general purposes of prior art corrections.

The lenses may be given any desired outline shape and will adapt themselves to practically all of the usual prior art outline shapes. They may also be mounted in rimmed or rimless frames and mountings of prior art construction in the usual prior art ways.

The definite reduction from a distant object to a near object is shown by the formula set forth and can be applied where necessary but for practically all the ordinary cases the reduction is so small as to be neglectable since it is less than the tolerance of the eyes.

No specific mention has been made of bifocal lenses but they fall directly under the formulas given herein, except that there are three surfaces often instead of four surfaces. The three surface formula is derived from the basic differential equations or may be derived from the four surface equations by putting the first thickness equal to zero and the first power equal to zero, and in case of a fused bifocal, substituting the correct values of the indices of refraction that are actually used in the lenses.

The expressions, true magnification, or shape magnification, etc. are used for the magnification due to the shape and thicknesses, etc., as distinguished from the power magnification that would be produced by an infinitely thin lens having the same focal power as the lens combination actually used and placed at the same distance from the cornea as the ocular surface of the lens combination.

From the foregoing it will be seen that I have provided a new computation of lens systems of this character and have provided new lenses to give the desired corrective results by which the computation, manufacture, and dispensation of lenses of this character are materially simplified and cheapened, and by which service to the public is materially facilitated.

Having described my invention, I claim:

1. The method of forming a blank, for an ophthalmic lens, of lens medium of an index of refraction such as is generally used for ophthalmic lenses and which has a separately controlled shape magnification component $S^1$ which distinguishes from the inherent power magnification due to the focal power present in the finished lens, with the amount of said shape magnification component dependent upon the front surface power factor $D_1$ and the center thickness factor $\tau$ of the finished lens, comprising choosing a value for one of said factors which is consistent with the weight, appearance, and optical characteristics desired in the finished lens, calculating the other of said factors by means of the formula $$S^1 = \frac{1}{1-\frac{\tau}{\mu}D_1}$$

according to the index of refraction $\mu$ of the lens medium used for said blank, the desired magnification component $S^1$ and the said chosen value for the first of said factors, and forming a front optical surface, to a curvature simulating the front curvature consideration $D_1$ of the calculation, on a piece of lens medium of said index of refraction having a center thickness which is greater than the said determined thickness factor $\tau$ of said calculation by an amount which is such that after the said surface has been formed the center thickness of said piece of lens medium will still be sufficiently greater than said determined thickness factor $\tau$ to allow the forming of a rear ocular surface on said piece of lens medium, without reducing the center thickness of said piece of lens medium below the said determined thickness factor $\tau$, which, in combination with said front optical surface, will produce the desired focal power $D_e$ in the finished lens, said blank being adapted to be reduced to said determined center thickness factor $\tau$ during the forming of said rear ocular surface so as to introduce the focal power $D_e$ desired with substantially no change in the amount of said separately controlled magnification component $S^1$.

2. The method of making an ophthalmic lens, of lens medium of an index of refraction such as is generally used for ophthalmic lenses, having a separately controlled magnification component $S^1$ which distinguishes from the inherent magnification due to focal power present in the finished lens, with the amount of said magnification component depending upon the front surface power factor $D_1$ and the center thickness factor $\tau$ of the finished lens, comprising choosing a value for one of said factors which is consistent with the weight, appearance and optical characteristics desired in the finished lens, calculating the other of said factors by means of the formula $$S^1 = \frac{1}{1-\frac{\tau}{\mu}D_1}$$

according to the index of refraction $\mu$ of the lens medium used for said lens, the desired magnification component $S^1$ and the said chosen value for the first of said factors, forming a front optical surface, to a curvature simulating the front curvature consideration $D_1$ of the calculation, on a piece of lens medium of said index of refraction having a center thickness which is greater than the said determined thickness factor $\tau$ of said calculation by an amount which is such that after the said surface has been formed the center thickness of said piece of lens medium will still be sufficiently greater than said determined thickness factor $\tau$ to allow the forming of a rear ocular surface on said piece of lens medium, without reducing the center thickness of said piece of lens medium below the said determined thickness factor $\tau$, which, in combination with the front optical surface, will produce the desired focal power $D_e$ in the finished lens, and forming said rear ocular surface on said piece of lens medium to such a curvature that when combined with the front optical surface it will introduce the focal power $D_e$ desired in the finished lens and simultaneously reducing the lens medium to the determined center thickness factor $\tau$ so as to introduce substantially no change in the amount of said separately controlled magnification component $S^1$.

3. The method of forming a blank, for an ophthalmic lens system, of lens medium of an index of refraction such as is generally used for ophthalmic lenses, and which has a separately controlled magnification component $S^1$ which distinguishes from the inherent magnification due to focal power present in the finished lens system, with the amount of said magnification component dependent upon a factor $D_1$ which is the combination of all of the surface powers of the lens system except that of the ocular surface, and a factor $\Sigma\tau$ which is the combination of the center thicknesses and the center separations of the finished lens system, comprising choosing values, to make up one of said factors, which are consistent with the weight, appearance, and optical characteristics desired in the finished lens system, calculating the values to make up the other of said factors by means of the formula $$S^1=\frac{1}{C_7}$$

$C_7$ being a function of all the surfaces, refractive indices of the glass, thicknesses and separations, except the power of the ocular surface, according to the indices of refraction $\mu$ of the pieces of lens medium used for said system, the desired magnification component $S^1$, and the said chosen values which make up the first of said factors, forming optical surfaces on all of the surfaces of the lens system except the ocular surface to curvatures simulating the surface power considerations $\rho$ of the calculation, on pieces of lens medium of said indices of refraction which have center thicknesses and separations $\tau$ which together make up a total center thickness which is greater than the said determined center thickness and separation factor $\Sigma\tau$ of said calculation by an amount which is such that after the said optical surfaces have been formed on all of the surfaces of the lens system except the ocular surface thereof, the total of the center thicknesses and separations of said pieces of lens medium will still be sufficiently greater than said determined center thickness and separation factor $\Sigma\tau$ to allow the forming of a rear ocular surface on one of said pieces of lens medium, without reducing the total of the center thicknesses and separations of said pieces of lens medium below the said determined center and thickness factor $\Sigma\tau$, which, in combination with the said optical surfaces which have been formed on said pieces of lens medium, will produce the desired focal power $D_e$ in the finished lens system, and supporting said pieces of lens medium in operative relation with each other, said blank being adapted to have the total of its center thicknesses and separations reduced to said determined center thickness and separation factor $\Sigma\tau$ during the forming of said rear ocular surface so as to introduce the focal power $D_e$ desired in the lens system with substantially no change in the amount of said separately controlled magnification component.

4. The method of making an ophthalmic lens system, of lens medium of an index of refraction such as is generally used for ophthalmic lenses, and which has a separately controlled magnification component $S^1$ which distinguishes from the inherent magnification due to focal power present in the finished lens system, with the amount of said magnification component dependent upon a factor $D_1$ which is the combination of all of the surface powers of the lens system except that of the ocular surface, and a factor $\Sigma\tau$ which is the combination of the center thicknesses and the center separations of the finished lens system, comprising choosing values, to make up one of said factors, which are consistent with the weight, appearance, and optical characteristics desired in the finished lens system, calculating the values to make up the other of said factors by means of the formula $$S^1=\frac{1}{C_7}$$

$C_7$ being a function of all the surfaces, refractive indices of the glass, thicknesses and separations, except the power of the ocular surface, according to the indices of refraction $\mu$ of the pieces of lens medium used for said system, the desired magnification component $S^1$, and the said chosen values which make up the first of said factors, forming optical surfaces on all of the surfaces of the lens system, except the ocular surface, to curvatures simulating the surface power considerations $\rho$ of the calculation, on pieces of lens medium of said indices of refraction which have center thicknesses and separations $\tau$ which together make up a total center thickness which is greater than the said determined center thickness and separation factor $\Sigma\tau$ of said calculation by an amount which is such that after the said optical surfaces have been formed on all of the surfaces of the lens systems except the ocular surface thereof, the total of the center thicknesses and separations of said pieces of lens medium will still be sufficiently greater than said determined center thickness and separation factor $\Sigma\tau$ to allow the forming of a rear ocular surface on one of said pieces of lens medium without reducing the total of the center thicknesses and separations of said pieces of lens medium below the said determined center and thickness factor $\Sigma\tau$, forming said rear ocular surface on one of said pieces of lens medium to such a curvature which, when combined with the said optical surfaces which have been formed on the said pieces of lens medium will produce the desired focal power $D_e$ in the finished lens system and supporting said pieces of lens medium in operative relation with each other, said lens system being adapted to have the total of its center thicknesses and separations reduced to said determined center thickness and separation factor $\Sigma\tau$ during the forming of said rear ocular surface so as to introduce the focal power $D_e$ desired in the lens system, with substantially no change in the amount of said separately controlled magnification component $S^1$, said steps of said method being taken in desired order.

EDGAR D. TILLYER.